(12) United States Patent
Yoneyama et al.

(10) Patent No.: US 7,891,920 B2
(45) Date of Patent: Feb. 22, 2011

(54) SPINDLE DEVICE AND MACHINING CENTER INCLUDING THE SAME

(75) Inventors: Hiroki Yoneyama, Maebashi (JP); Yoshifumi Inagaki, Maebashi (JP); Osamu Iwasaki, Maebashi (JP); Yoshinori Tatsuda, Kanazawa (JP)

(73) Assignees: NSK Ltd., Tokyo (JP); Tsudakoma Corp., Ishikawa (JP)

( * ) Notice: Subject to any disclaimer, the term of this patent is extended or adjusted under 35 U.S.C. 154(b) by 65 days.

(21) Appl. No.: 12/519,225

(22) PCT Filed: Oct. 31, 2007

(86) PCT No.: PCT/JP2007/071255
§ 371 (c)(1),
(2), (4) Date: Jun. 15, 2009

(87) PCT Pub. No.: WO2008/078455
PCT Pub. Date: Jul. 3, 2008

(65) Prior Publication Data
US 2010/0034610 A1 Feb. 11, 2010

(30) Foreign Application Priority Data
Dec. 27, 2006 (JP) .............................. 2006-351015
Dec. 27, 2006 (JP) .............................. 2006-351016

(51) Int. Cl.
*B23C 1/20* (2006.01)
(52) U.S. Cl. ........................ 409/201; 409/216; 409/230; 409/231

(58) Field of Classification Search ................. 409/201, 409/216, 211, 231–232, 144, 230; 408/236; 29/39–40
See application file for complete search history.

(56) References Cited
U.S. PATENT DOCUMENTS
5,878,476 A * 3/1999 Noelle et al. ................. 409/230

(Continued)

FOREIGN PATENT DOCUMENTS
DE 102004062138 B3 * 3/2006

(Continued)

OTHER PUBLICATIONS
English abstract from the Derwent database for JP-2006-289595-A, which JP '595 was published Oct. 26, 2006.*

(Continued)

*Primary Examiner*—Erica E Cadugan
(74) *Attorney, Agent, or Firm*—Sughrue Mion, PLLC

(57) ABSTRACT

To provide a spindle device and a machining center, in which spindle replacement can be carried out in an extremely short time, downtime during maintenance is short, and productivity is high. In a spindle device 20, there are provided wirings 41, 42 extended from a spindle 30 and wired to support arms via a bracket 21, and joint components 74, each provided at a position a predetermined length extended from extended parts for the wirings 41, 42, are accommodated within the bracket 21.

9 Claims, 5 Drawing Sheets

U.S. PATENT DOCUMENTS

| | | | |
|---|---|---|---|
| 5,896,794 A * | 4/1999 | Trautmann | 82/129 |
| 6,474,914 B1 * | 11/2002 | Lang | 409/144 |
| 6,554,551 B1 * | 4/2003 | Marelli | 409/201 |
| 6,746,188 B2 * | 6/2004 | Watanabe | 409/201 |
| 6,874,980 B1 * | 4/2005 | Noelle et al. | 409/131 |
| 7,311,482 B2 * | 12/2007 | Sugita et al. | 409/231 |
| 2004/0074074 A1 * | 4/2004 | Kikkawa et al. | 409/231 |
| 2009/0162160 A1 * | 6/2009 | Lechleiter et al. | 409/201 |
| 2010/0028094 A1 * | 2/2010 | Yoneyama et al. | 408/56 |

FOREIGN PATENT DOCUMENTS

| | | | |
|---|---|---|---|
| DE | 102005032487 B3 * | 1/2007 | |
| DE | 102007038312 A1 * | 2/2009 | |
| EP | 1316385 A2 * | 6/2003 | |
| JP | 7-266196 A | 10/1995 | |
| JP | 2006-007328 A | 1/2006 | |
| JP | 2006-129611 A | 5/2006 | |
| JP | 2006-289595 A | 10/2006 | |

OTHER PUBLICATIONS

Machine translation of JP-07-266196, which JP '196 was published Oct. 1995.*

Machine Translation of JP 2006-129611, which JP '611 was published May 2006.*

International Search Report for PCT/JP2007/071255, dated Feb. 19, 2008.

International Preliminary Report on Patentability for PCT/JP2007/071255, dated Feb. 19, 2008.

* cited by examiner

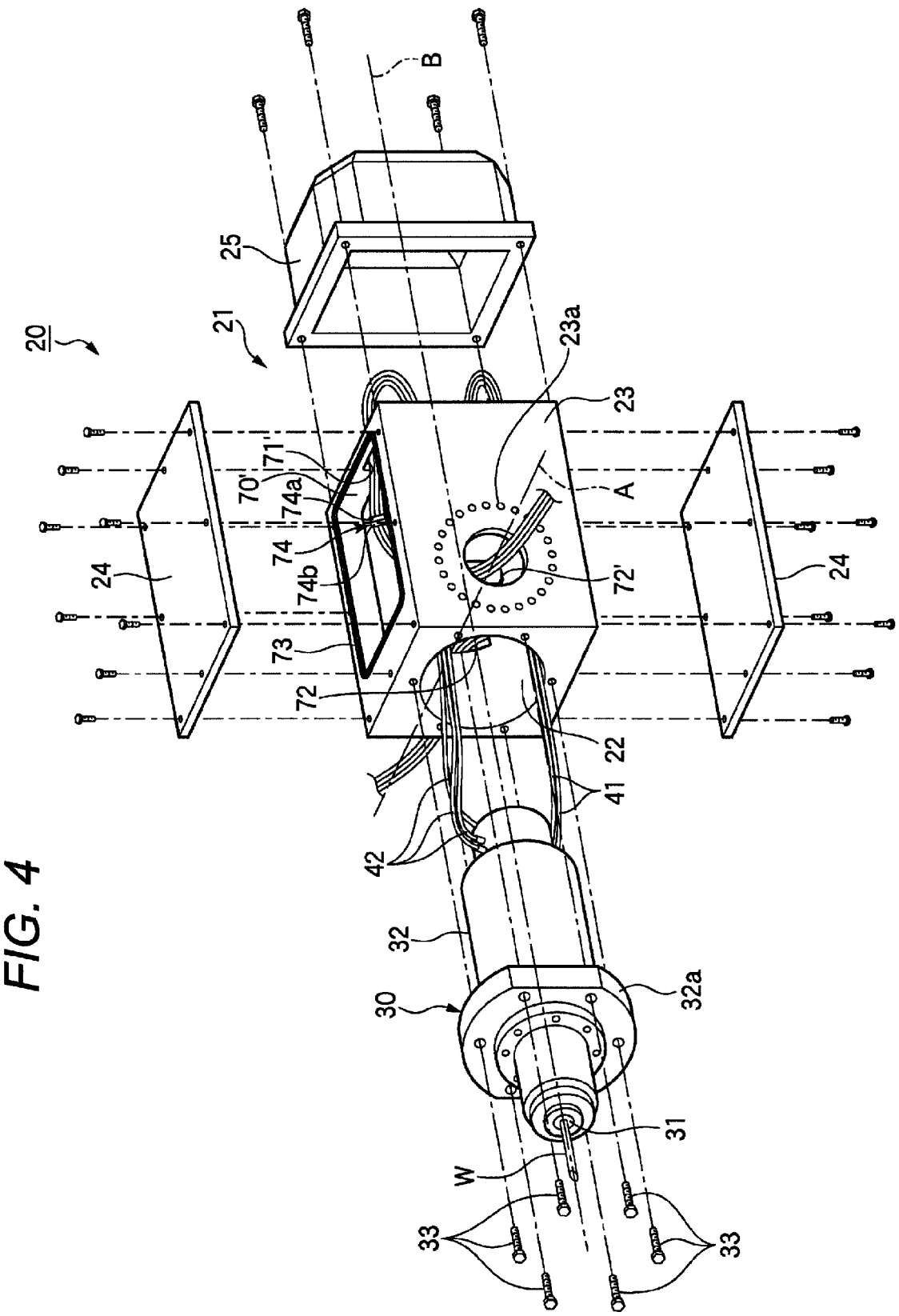

SPINDLE DEVICE AND MACHINING CENTER INCLUDING THE SAME

BACKGROUND OF THE INVENTION

1. Field of the Invention

The present invention relates to a spindle device and machining center including the spindle devices, and more particularly relates to a spindle device attached to a spindle head of portal machining center and a machining center including the spindle device.

2. Description of Related Art

As a machining center for carrying out working such as cutting and/or drilling by three-dimensional relative movement between a large workpiece and a tool, there has conventionally been used, for example, a portal machining center for causing a straight reciprocating movement of a table to which a workpiece is attached, and for controlling a spindle having a tool in X-axis, Y-axis and Z-axis directions.

In a portal machining center, a saddle is attached to a cross rail supported by two columns, a spindle head is attached to an end of a ram moving in a Z-axis direction with respect to the saddle, and a spindle is pivotably attached to two support arms of this spindle head via a bracket.

In a spindle of this type, a motor-built-in type in which a motor is housed in the spindle, is used, and there is known a machine tool in which a power line for driving this motor and a signal line for a sensor or the like are wired from a spindle head side, and relay connectors are provided to establish connections therebetween (see Patent Document 1, for example).

Patent Document 1: Japanese Patent Unexamined Publication No. JP-A-2006-129611 (FIG. 1)

DISCLOSURE OF THE INVENTION

Problems To Be Solved By the Invention

Actually, in the machine tool described in Patent Document 1, an attachment is attached to a rotary index shaft of a spindle head, and relay connectors are provided at a connection between the attachment and the rotary index shaft. Thus, for example, when the spindle is detached from the attachment for maintenance, the attachment and the rotary index shaft have to be disassembled in order to disconnect the power line and the signal line via the relay connectors, thereby taking time to perform maintenance. During maintenance, the machine has to be stopped, and therefore, there arise problems that downtime is increased and productivity is decreased.

Furthermore, when the power line and the signal line are wired together as described in Patent Document 1, the signal line might be influenced by noise from the power line.

The present invention has been made in view of the above-described problems, and its first object is to provide a spindle device and a machining center, in which spindle replacement can be carried out in an extremely short time, downtime during maintenance is short, and productivity is high. Furthermore, a second object of the present invention is to provide a spindle device and a machining center, which are capable of preventing wiring from being influenced by noise.

Solution To the Problems

The first object of the present invention is achieved by the following aspects (1) to (4).
(1) A spindle device including:
a bracket pivotably attached to a support arm, and having a tubular portion substantially perpendicular to a pivot axis of the bracket;
a spindle which is fitted into the tubular portion of the bracket in an attachable/detachable manner, and which allows a tool to be mounted on one end side of the spindle; and
a wiring extended from the spindle and wired to the support arm via the bracket,
wherein a joint component, provided at a position where a predetermined length extended from an extended part of the wiring, is accommodated within the bracket.
(2) The spindle device according to (1),
wherein the bracket includes:
a bracket main body having the tubular portion, and a groove portion accommodating the joint component; and
a cover attached to the bracket main body so as to cover an opening of the groove portion.
(3) The spindle device according to (1) or (2),
wherein the bracket main body is provided with:
an opening hole penetrating into the groove portion from a rear end face of the bracket main body; and
an inclined hole opened from the groove portion to an attachment surface to which a pivot shaft of the support arm is attached, and
wherein the wiring is wired to the support arm via the opening hole, the groove portion and the inclined hole of the bracket main body.
(4) A machining center including the spindle device according to any one of (1) to (3).

Furthermore, the second object of the present invention is achieved by the following aspects (5) to (9).
(5) A spindle device including:
a bracket pivotably attached to a support arm, and having a tubular portion substantially perpendicular to a pivot axis of the bracket; and
a spindle that is fitted into the tubular portion of the bracket in an attachable/detachable manner, wherein a tool is mounted on one end side of the spindle, and first and second wirings are extended from the other end side of the spindle,
wherein the bracket includes:
a space through which the first and second wirings are separately wired; and
two opening holes for individually leading the first and second wirings into the space.
(6) The spindle device according to (5),
wherein the first wiring is a power line for a motor contained in the spindle, and the second wiring is a signal line for a sensor.
(7) The spindle device according to (5) or (6),
wherein the space has first and second spaces formed at substantially symmetry positions with respect to a center axis of the tubular portion.
(8) The spindle device according to any one of (5) to (7),
wherein the bracket has lateral faces forming a pair of attachment surfaces to which pivot shafts of a pair of support arms are attached, and
wherein the space is opened to the pair of the attachment surfaces so as to individually lead out the first and second wirings.
(9) A machining center including the spindle device according to any one of (5) to (8).

Advantageous Effects

According to the present invention, there is provided the wiring extended from the spindle and wired to the support arm via the bracket, and the joint component, provided at a position a predetermined length extended from the extended part of the wiring, is accommodated within the bracket. Therefore, when the spindle is detached from the bracket, the wiring can be disconnected via the joint component while the bracket is kept attached to the support arm. Also, when the spindle is attached to the bracket, the wiring can be connected via the joint component while the bracket is kept attached to the support arm. Thus, the spindle can be replaced in an extremely short time, resulting in short downtime during maintenance and high productivity.

Further, the joint component is accommodated within the groove portion of the bracket main body, which is covered by the cover. Therefore, when the spindle is detached from the bracket, the joint component can be easily pulled out from the bracket together with the spindle, and the joint component can be prevented from interfering with the other component within the bracket.

Moreover, the bracket main body is provided with the opening hole penetrating into the groove portion from the rear end face of the bracket main body, and the inclined hole opened from the groove portion to the attachment surface to which the pivot shaft of the support arm is attached. And the wiring is wired to the support arm via the opening hole, the groove portion and the inclined hole of the bracket main body. Therefore, the wiring extended from the spindle can be smoothly wired to the support arm.

Further, according to the present invention, the bracket to which the spindle is attached is provided with the space through which the first and second wirings are separately wired, and the two opening holes for individually leading the first and second wirings into the space, and therefore, the first and second wirings can be prevented from being influenced by noise. In particular, when the first wiring is a power line for a motor contained in the spindle and the second wiring is a signal line for a sensor, the signal line can be prevented from being influenced by noise caused by the power line. Thus, an operation of the spindle can be accurately detected by the sensor.

Furthermore, since the space has the first and second spaces formed at substantially symmetry positions with respect to the center axis of the tubular portion of the bracket, the first and second wirings can be wired separately from each other, and each wiring can be prevented from being influenced by noise with more certainty.

Moreover, with the aim of individually leading out the first and second wirings, the space is opened to a pair of the attachment surfaces to which the pivot shafts of a pair of the support arms are attached, and therefore, the first and second wirings can be wired to the pivot shafts without being influenced by noise.

BRIEF DESCRIPTION OF THE DRAWINGS

FIG. 4 is an exploded perspective view of the spindle device.

Figure 1:
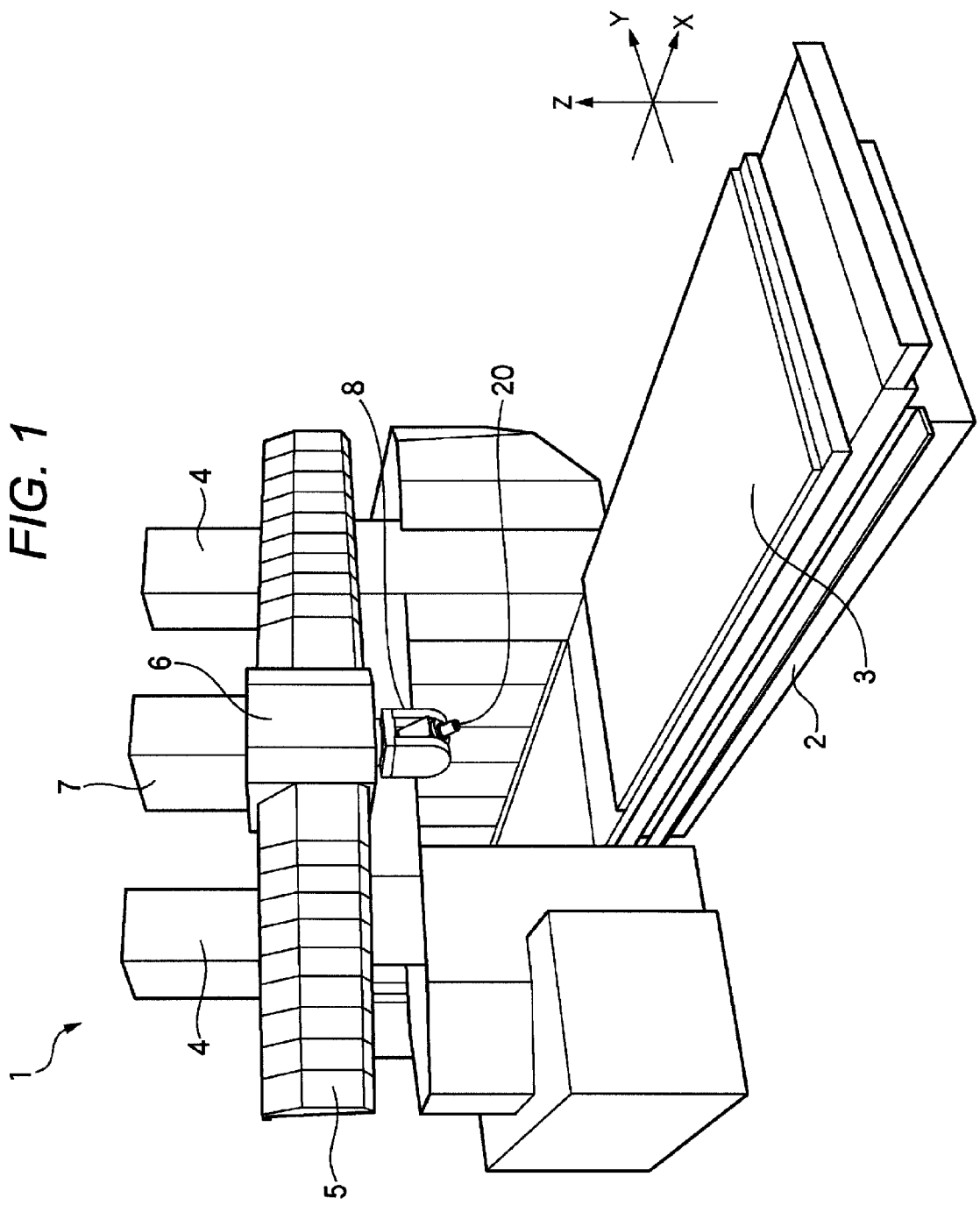
FIG. 1 is a schematic diagram of a portal machining center to which a spindle device of the present invention is applied.

DESCRIPTION OF REFERENCE CHARACTERS 1 portal machining center (machining center)
20 spindle device
21 bracket
22 tubular portion
23 bracket main body
24 flat plate cover
25 rear lid
30 spindle
41 power line (first wiring)
42 signal line (second wiring)
70, 70' groove portion
71, 71' opening hole
72, 72' inclined hole
$S_1$ first space
$S_2$ second space

DETAILED DESCRIPTION OF EXEMPLARY EMBODIMENTS OF THE PRESENT INVENTION

Hereinafter, a spindle device according to the present invention and a portal machining center, as a machining center according to the present invention, will be described in detail with reference to the drawings.

As shown in FIG. 1, in a portal machining center 1, a table 3 is supported on a bed 2 so as to be movable in an X-axis direction, and a pair of columns 4 are vertically provided on opposite sides of the bed 2. A cross rail 5 is running across upper ends of the columns 4, and a saddle 6 is provided at the cross rail 5 so as to be movable in a Y-axis direction. Further, a ram 7 that can be raised and lowered in a Z-axis direction is supported by the saddle 6, and a spindle head 8 for holding a spindle device 20 of the present invention while allowing driving the spindle device 20 in a rotary index manner around the Y axis and Z axis is fitted to a lower end of the ram 7.

Figure 2:
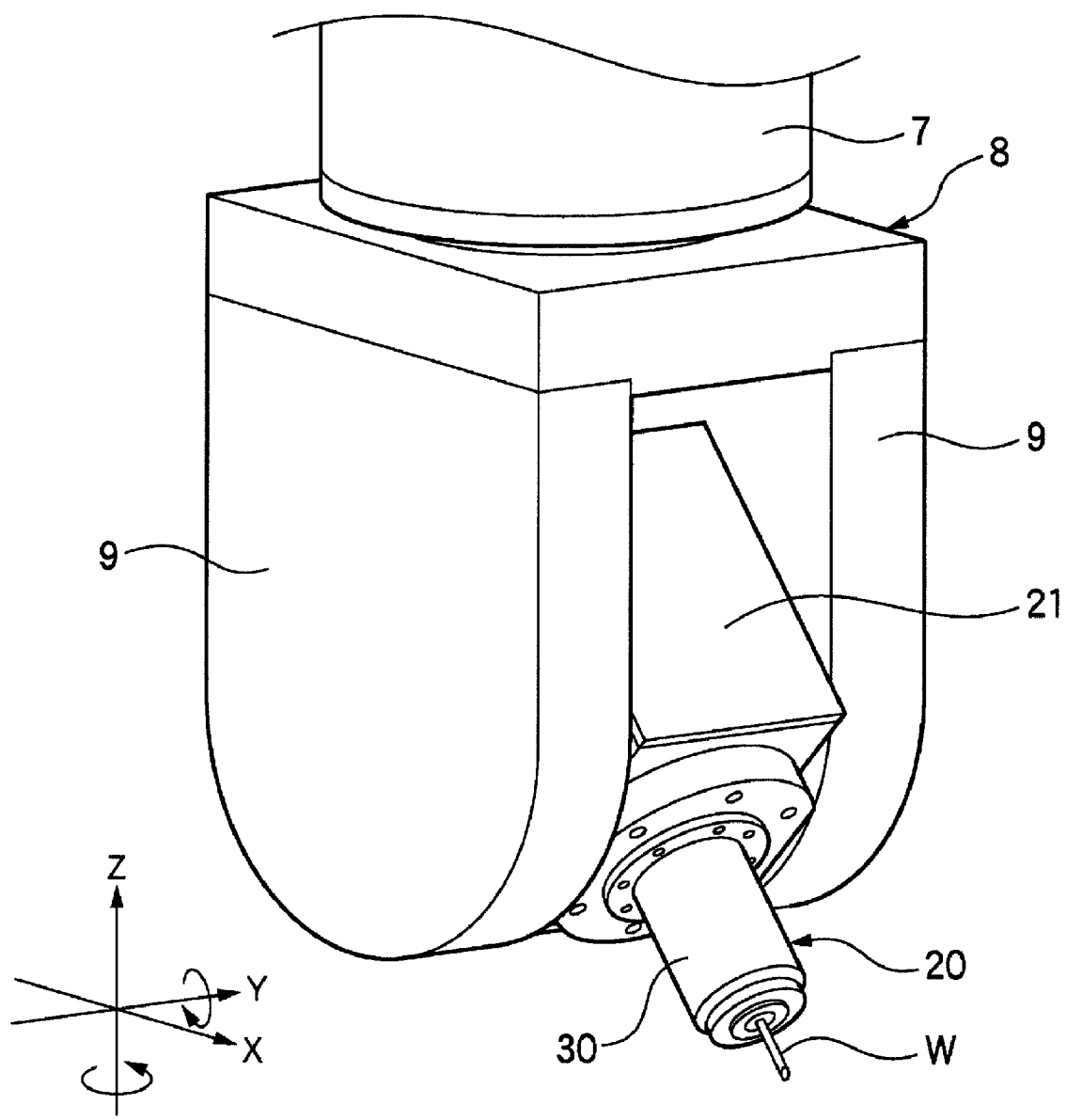
FIG. 2 is a perspective view showing principal portions of a spindle head shown in FIG. 1.
Figure 3:
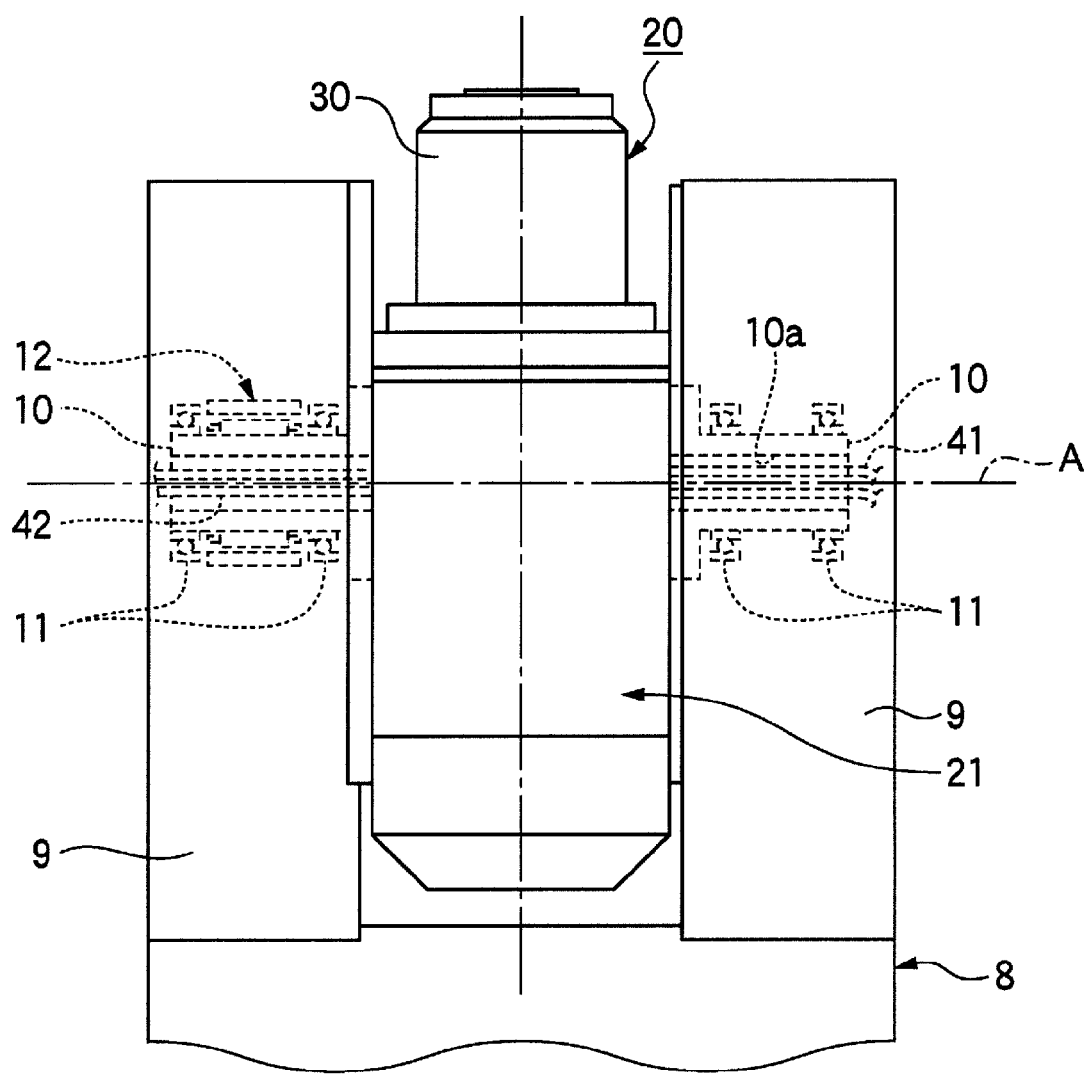
FIG. 3 is a front view showing the spindle head.

As shown in FIGS. 2 and 3, the spindle head 8 is provided with a pair of support arms 9 so that a bracket 21 of the spindle device 20 is sandwiched therebetween, and a pair of pivot shafts 10 fixed at lateral faces of the bracket 21 are rotatably accommodated within the support arms 9 via a plurality of bearings 11. Furthermore, a motor 12 is disposed at one of the pivot shafts 10; thus, the spindle device 20 is attached to a pair of the support arms 9 so as to be pivotable around the Y axis (pivot axis A). It should be noted that pivotal driving of the spindle device 20 may be provided by gear driving of the pivot shaft 10 instead of the motor 12 disposed around the pivot shaft 10.

As shown in FIG. 4, the bracket 21 of the spindle device 20 includes:

a bracket main body 23 to which the pivot shafts 10 are fixed at lateral faces thereof in the Y-axis direction, and which has a tubular portion 22 which passes through the bracket main body 23 in the X-axis direction (approximately perpendicular to the pivot axis A);

a pair of flat plate covers 24 fixed at lateral faces of the bracket main body 23 in the Z-axis direction; and a rear lid 25 fixed at a rear end face of the bracket main body 23.

Furthermore, a spindle 30, a tip side (one end side) of which a tool W is fitted, is attached into the tubular portion 22 of this bracket main body 23 in an attachable/detachable manner. It should be noted that in FIG. 4, the reference character 23a denotes a bolt hole for fixing the pivot shaft 10.

Moreover, in the spindle 30, a rotation portion 31 quipped with the tool W is supported so as to be rotatable via a not shown bearing with respect to a housing 32. The rotation portion 31 is driven by a not shown internal motor. It should be noted that as the spindle 30, a well-known motor-built-in type spindle is applicable. This spindle 30 is fixed to the bracket 21 by fastening bolts between a flange portion 32a provided at the housing 32 and a front end face of the bracket main body 23. Therefore, the spindle 30 can be pulled out from the bracket 21 toward the tip side by removing a plurality of bolts 33.

A rear end of the housing 32, as the other end side of the spindle 30, is formed to have a small diameter. Thus, power lines 41 (first wirings) functioning as wirings through which power is supplied to a stator of the motor, and signal lines (second wirings) functioning as wirings for a sensor provided at the spindle 30 are extended rearward so as not to interfere with the tubular portion 22 of the bracket main body 23. It should be noted that in the present embodiment, as the sensor, an encoder for detecting the rotation speed of the rotation portion 31, a position detection sensor for detecting the position of a clamp piston, and/or a tool detection sensor for detecting the presence or absence of a tool are provided.

The power lines 41 led out from the housing 32 into the rear lid 25 are wired through a first space $S_1$ formed in the bracket main body 23. On the other hand, each signal line 42 inside the rear lid 25 is wired through a second space $S_2$ formed at a substantially symmetry position to the first space $S_1$ with respect to a center axis B of the tubular portion 22 of the bracket main body 23.

Figure 5A:
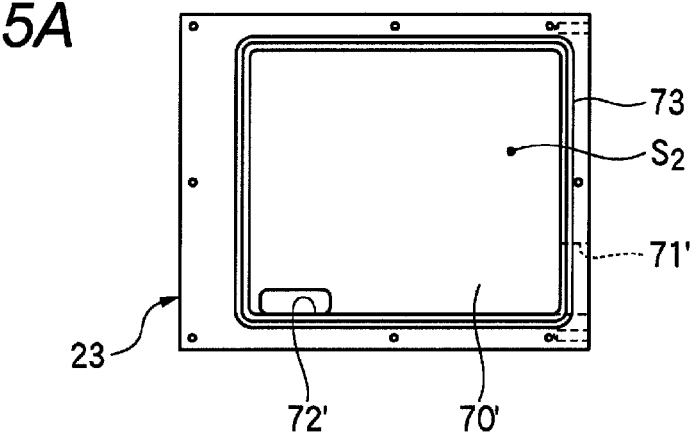
FIG. 5A is a top view of a bracket main body.

The first and second spaces $S_1$ and $S_2$ are formed into substantially the same shapes. As shown in FIGS. 4 and 5, the bracket main body 23 is provided with:

groove portions 70, 70' formed at lateral faces of the bracket main body 23 (in the Z-axis direction) perpendicular to the pivot axis A of the bracket main body 23 and the center axis B of the tubular portion 22;

opening holes 71, 71' penetrating into the groove portions 70, 70' from the rear end face of the bracket main body 23; and inclined holes 72, 72' that are opened from bottom faces of the groove portions 70, 70' to respective attachment surfaces to which the pivot shafts 10 are attached, and that are partially opened to an inner peripheral face of the tubular portion 22.

Further, ring grooves 73, to which not shown O-rings are fitted, are formed around the groove portions 70, 70', and a pair of the flat plate covers 24 are each fixed to the bracket main body 23, thereby sealing lateral face openings of the groove portions 70, 70'.

Further, the power lines 41 and the signal lines 42, which are wired through the first and second spaces $S_1$ and $S_2$ formed as described above and which are led out from the respective attachment surfaces, are each taken out from a cylindrical face 10a formed at each of a pair of the pivot shafts 10, and are each guided toward the spindle head (see FIG. 3). Furthermore, as shown in FIG. 4, the power lines 41 and the signal lines 42 are each connected along the way by joint components 74 such as solderless terminals and/or connectors including a pair of connecting components for connecting terminals in a detachable/attachable manner. The joint components 74 are each provided at a position a predetermined length extended from extended parts for the wirings 41, 42, which are extended from an outer face of the housing 32, and the joint components 74 are accommodated within the groove portions 70, 70'. Herein, a "predetermined length" in the present embodiment refers to a length necessary for providing wiring at least from the extended parts for the wirings 41, 42 to the joint components 74 provided at the wirings 41, 42 at the spindle head side. Moreover, the opening holes 71, 71' of the bracket main body 23 are formed to have sizes through which the wirings 41, 42 and the joint components 74 can sufficiently pass. It should be noted that the joint component 74 of FIG. 4 shows: a male connector 74a provided at wirings extended from the spindle 30; and a female connector 74b provided at the wirings at the spindle head side.

Therefore, when the spindle 30 is detached from the bracket 21, the flat plate covers 24 are removed to disengage the joint components 74 accommodated within the groove portions 70, 70', thereby disconnecting the wirings 41, 42. Then, as the spindle 30 is pulled out from the bracket 21, the disconnected wirings 41, 42 at the spindle side and the joint components 74 are passed through the opening holes 71, 71' and taken out from the bracket 21. Accordingly, these wirings 41, 42 are disconnected by disengaging the joint components 74, and the disconnection of these wirings 41, 42 is enabled while the bracket main body 23 is kept connected to the support arms 9.

Further, when the spindle 30 is attached to the bracket 21, in a state where the flat plate covers 24 and the rear lid 25 are removed, the wirings 41, 42 exposed from the rear end face of the bracket main body 23 are wired into the groove portions 70, 70' via the opening holes 71, 71', and are connected via the joint components 74 to the wirings 41, 42 wired into the groove portions 70, 70' from the spindle head side. Accordingly, the connection of these wirings is enabled while the bracket main body 23 is kept connected to the support arms 9.

Figure 5B:
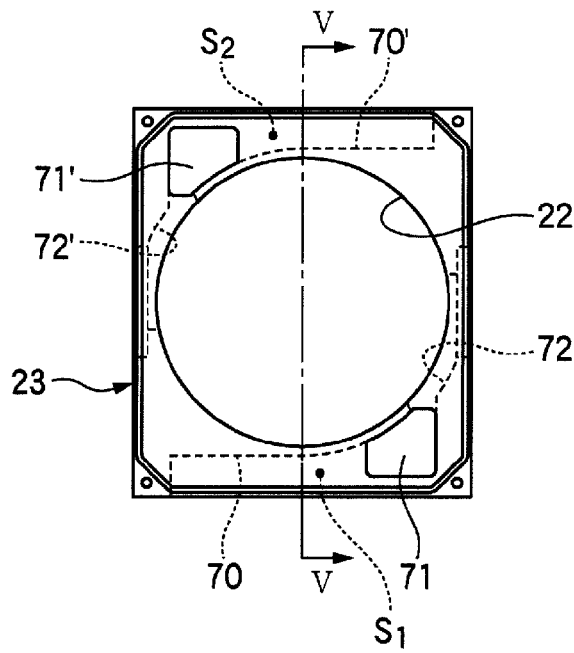
FIG. 5B is a rear view of the bracket main body.
Figure 5C:
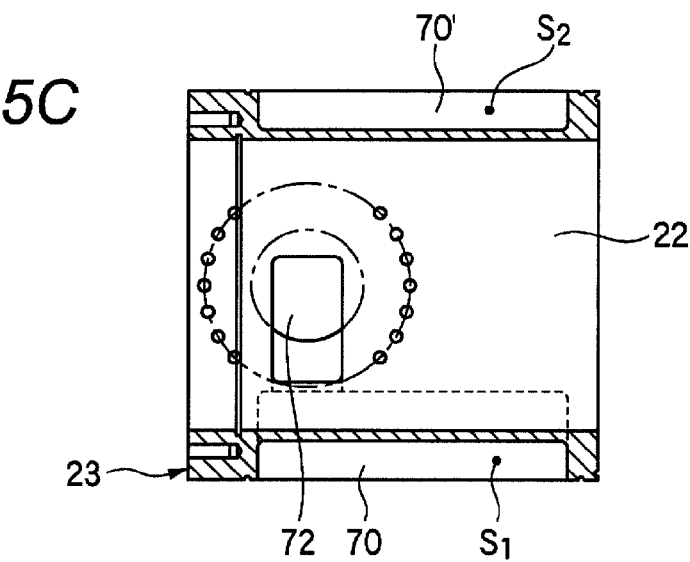
FIG. 5C is a cross-sectional view taken along the line V-V of FIG. 5B.

It should be noted that as shown in FIG. 5B, in a state where the spindle 30 is attached to the bracket 21, the phase from which the power lines 41 are taken out and the phase of the opening hole 71 of the first space $S_1$ are located close to each other, and furthermore, the phase from which the signal lines 42 are taken out and the phase of the opening hole 71' of the second space $S_2$ are also located as close as possible to each other. Therefore, these wirings 41, 42 are prevented from causing interference inside the rear lid 25, and wiring arrangement can be further facilitated.

Accordingly, in the spindle device 20 of the present embodiment, there are provided the wirings 41, 42 extended from the spindle 30 and wired to the support arms 9 via the bracket 21, and the joint components 74, each provided at a position a predetermined length extended from the extended parts for the wirings 41, 42, are accommodated within the bracket 21. Thus, when the spindle 30 is detached from the bracket 21, the wirings 41, 42 can be disconnected via the joint components 74 while the bracket main body 23 is kept attached to the support arms 9. Besides, also when the spindle 30 is attached to the bracket 21, the wirings 41, 42 can be connected via the joint components 74 while the bracket main body 23 is kept attached to the support arms 9, thus making it possible to replace the spindle 30 in an extremely short time without detaching the bracket main body 23 from the support arms 9.

Further, the joint components 74 are accommodated within the groove portions 70, 70' of the bracket main body 23, which are covered by the flat plate covers 24. Therefore, when the spindle 30 is detached from the bracket 21, the joint components 74 can be easily pulled out from the bracket 21 together with the spindle 30, and furthermore, the joint components 74 can be prevented from interfering with the other component within the bracket 21.

Moreover, the bracket main body 23 is provided with: the opening holes 71, 71' penetrating into the groove portions 70, 70' from the rear end face of the bracket main body 23; and the inclined holes 72, 72' opened from the groove portions 70, 70' to the attachment surfaces to which the pivot shafts 10 of the support arms 9 are attached. And the wirings 41, 42 are wired to the support arms via the opening holes 71, 71', the groove portions 70, 70' and the inclined holes 72, 72' of the bracket main body 23. Therefore, the wirings 41, 42 extended from the spindle 30 can be smoothly wired to the support arms. In addition, since the rear end face of the bracket main body 23 is covered by the rear lid 25, these wirings 41, 42 can be wired without being exposed to the outside.

Further, in the spindle device 20 of the present embodiment, the bracket 21 to which the spindle 30 is attached is provided with: the first and second spaces $S_1$, $S_2$ through which the power lines 41 and the signal lines 42 are separately wired; and the two opening holes 71, 71' for individually leading the power lines 41 and the signal lines 42 into the groove portions 70, 70' of the first and second spaces $S_1$, $S_2$. Therefore, the signal lines 42 can be prevented from being influenced by noise caused by the power lines 41, and an operation of the spindle 30 can be accurately detected by the sensor.

Furthermore, since the first and second spaces $S_1$, $S_2$ are formed at substantially symmetry positions with respect to the center axis B of the tubular portion 22 of the bracket main body 23, the power lines 41 and the signal lines 42 can be wired separately from each other, and the signal lines 42 can be prevented with more certainty from being influenced by noise caused by the power lines 41.

Moreover, with the aim of individually leading out the power lines 41 and the signal lines 42, the first space $S_1$ is opened to one of the attachment surfaces of the bracket main body 23 to which the pivot shaft 10 of one of the support arms 9 is attached, and the second space $S_2$ is opened to the other attachment surface of the bracket main body 23 to which the pivot shaft 10 of the other support arm 9 is attached. Therefore, the signal lines 42 can be wired to the pivot shaft without being influenced by noise caused by the power lines 41.

It should be noted that the present invention is not limited to the foregoing embodiments, and variations, modifications, etc. may be made to the present invention as deemed appropriate.

In the present embodiment, the joint components 74 are accommodated within the groove portions 70, 70', and the spindle 30 is detached from the bracket 21 after removing the flat plate covers 24 and disengaging the joint components 74. However, the joint component 74 may be accommodated at a position (e.g., within the rear lid 25) through which the joint component 74 is pulled out from the tubular portion 22 in conjunction with pulling out of the spindle 30 from the bracket 21.

Further, in the present embodiment, the spindle device 20 is pivotably supported by a pair of the support arms 9 of the spindle head 8. However, the spindle device 20 may alternatively be supported by a single support arm in a cantilever manner.

Furthermore, the shapes of the first and second spaces $S_1$, $S_2$ formed in the bracket main body 23 can be changed to any shapes as long as the objects of the present invention are achieved. For example, the first and second spaces $S_1$, $S_2$ may be a single communicating space, and also in this case, it is only necessary to form the two opening holes 71, 71' for individually leading the power lines 41 and the signal lines into this space. Besides, if the first and second spaces $S_1$, $S_2$ divided into two are provided, these spaces $S_1$, $S_2$ may be located at substantially symmetry positions with respect to the center axis B of the tubular portion 22 as in the present embodiment, but the these spaces $S_1$, $S_2$ do not necessarily have to be located at symmetry positions.

It should be noted that the present application is based on Japanese Patent Application No. 2006-351015 filed on Dec. 27, 2006, and Japanese Patent Application No. 2006-351016 filed on Dec. 27, 2006, the entire contents of which are incorporated herein by reference.

The invention claimed is:

1. A spindle device comprising:
   a bracket pivotably attached to a support arm, and having a tubular portion with a central axis substantially perpendicular to a pivot axis of the bracket;
   a spindle which is fitted into the tubular portion of the bracket in an attachable and detachable manner, and which allows a tool to be mounted on one end side of the spindle; and
   a wiring extended from the spindle and wired to the support arm via the bracket,
   wherein a joint component for releasable connection of the wiring, provided at a position where a predetermined length of the wiring extends from the spindle, is accommodated within the bracket.

2. The spindle device according to claim 1, wherein the bracket comprises:
   a bracket main body having the tubular portion, and a groove portion accommodating the joint component; and
   a cover attached to the bracket main body so as to cover an opening of the groove portion.

3. The spindle device according to claim 2, wherein the bracket main body is provided with:
   an opening hole penetrating into the groove portion from an end face of the bracket main body; and
   a further hole opened from the groove portion to an attachment surface to which a pivot shaft of the support arm is attached, and
   wherein the wiring is wired to the support arm via the opening hole, the groove portion and the further hole of the bracket main body.

4. A machining center comprising the spindle device according to claim 1.

5. A spindle device comprising:
   a bracket pivotably attached to a support arm, and having a tubular portion with a center axis substantially perpendicular to a pivot axis of the bracket; and
   a spindle that is fitted into the tubular portion of the bracket in an attachable and detachable manner, wherein a tool is mounted on one end side of the spindle, and first and second wirings are extended from the other end side of the spindle,
   wherein the bracket comprises:
      spaces through which the first and second wirings are separately respectively wired; and
      two opening holes for individually leading the first and second wirings, respectively, into the respective space.

6. The spindle device according to claim 5, wherein the first wiring is a power line for a motor contained in the spindle, and the second wiring is a signal line for a sensor.

7. The spindle device according to claim 5, wherein the spaces include first and second spaces formed at substantially symmetrical positions with respect to the center axis of the tubular portion.

8. The spindle device according to claim 5, wherein a further support arm is provided, wherein the bracket has lateral faces forming a pair of attachment surfaces to which pivot shafts of the pair of support arms are attached, and wherein the space is opened to the pair of the attachment surfaces so as to individually lead out the first and second wirings.

9. A machining center comprising the spindle device according to claim 5.

* * * * *